United States Patent [19]

Dearborn, IV

[11] Patent Number: 5,366,124
[45] Date of Patent: Nov. 22, 1994

[54] VEHICLE BED LOAD CONTAINER AND STABILIZER

[76] Inventor: Arthur G. Dearborn, IV, 231A Essex St., Bangor, Me. 04401

[21] Appl. No.: 104,431

[22] Filed: Aug. 9, 1993

[51] Int. Cl.⁵ ............................................... B60R 7/00
[52] U.S. Cl. ........................ 224/42.46 R; 224/42.032; 296/37.006
[58] Field of Search ...................... 224/42.46 R, 42.32, 224/42.33, 42.34, 42.36, 42.4, 42.42, 273; 296/37.1, 37.6

[56] References Cited

U.S. PATENT DOCUMENTS

| | | | |
|---|---|---|---|
| 1,890,983 | 12/1932 | Griffith | 224/42.35 |
| 4,226,348 | 10/1980 | Dotter et al. | 224/42.42 |
| 4,288,011 | 8/1981 | Grossman | 224/42.42 |
| 4,540,213 | 9/1985 | Herlitz et al. | 286/37.6 |
| 4,705,317 | 11/1987 | Henri | 224/42.32 |
| 4,733,898 | 3/1988 | Williams | 286/24 R |
| 4,844,305 | 7/1989 | McKneely | 224/42.42 |
| 4,875,730 | 10/1989 | Justice | 286/37.5 |
| 5,052,737 | 10/1991 | Farmer, Jr. | 224/42.42 |
| 5,094,375 | 3/1992 | Wright | 224/42.46 R |
| 5,123,691 | 6/1992 | Ginn | 296/37.1 |

Primary Examiner—Henry J. Recla
Assistant Examiner—David J. Walczak
Attorney, Agent, or Firm—Daniel H. Kane

[57] ABSTRACT

A load container and stabilizer subdivides and partitions a vehicle bed such as a pickup truck, van, or utility vehicle bed for stabilizing a load from shifting during travel. An elongate container constructed of flexible fabric material panels extends between opposite sides of the vehicle bed. The flexible fabric material panels forming the elongate container subdivide or partition the vehicle bed for stabilizing a load. The load rests on the floor of the vehicle bed and is restrained from shifting by the flexible fabric material panels. Flaps are formed at the top of respective sides of the elongate container and extend over surfaces of the sidewalls of the vehicle bed. Fasteners secure the flaps and elongate container to the sidewalls at desired locations along the vehicle bed. Typically, the flaps are secured to the upper surface of shelves formed along the sidewalls. Multiple elongate containers can be deployed. The load containers and stabilizers collapse and fold into a small volume for storage in stuff sacks. A smaller load container and stabilizer is constructed to be secured along one sidewall only of the vehicle bed.

31 Claims, 4 Drawing Sheets

VEHICLE BED LOAD CONTAINER AND STABILIZER

TECHNICAL FIELD

This invention relates to a new load container and stabilizer for temporarily subdividing and partitioning a vehicle bed into cargo compartments or pockets. The compartments stabilize a load and prevent shifting of products during vehicle travel. The invention is applicable for vehicle beds of pickup trucks, vans, station wagons, suburbans, and utility vehicles generally. The new load container is constructed of flexible fabric material so that it can be collapsed, folded and conveniently stored in a stuff bag. It can be rapidly deployed from the storage bag when required for restraining products in a larger vehicle bed.

BACKGROUND ART

A variety of load organizers and stabilizers have been developed for pickup truck beds and vehicle trunk and cargo spaces. Generally such load containers are constructed from rigid components and cannot be readily removed and stored, or rapidly deployed from storage. For example, the Justice U.S. Pat. No. 4,875,730 describes the use of a plurality of panels hinged to a base in the truck bed. The panels pivot from a down position to an up position for organizing and stabilizing the load. The Williams U.S. Pat. No. 4,733,898 describes a combined pickup truck bed liner and storage unit with pull drawers.

In the Dottor et al. U.S. Pat. No. 4,226,348, relatively rigid dividers slide into slots of side walls pivotally attached to a floor mat for subdividing an automobile trunk. The "vehicle cargo organizer assembly" in U.S. Pat. No. 4,540,213 is a rack of cargo slats interconnected by a cross rail for use e.g. in the back of station wagons and square backs. U.S. Pat. No. 4,844,305 describes a compartment organizing frame of longitudinal and cross pieces with rails and a drawer for use in a pickup truck bed.

A disadvantage of such conventional vehicle bed cargo organizing structures is that they cannot be readily removed from the vehicle bed and collapsed and stored in a small space on the vehicle. Nor can they be rapidly deployed from a storage condition.

OBJECTS OF THE INVENTION

It is therefore an object of the present invention to provide a new load organizer and stabilizer for vehicle beds which can be collapsed and folded for storage in a small space on the vehicle. The load organizer and stabilizer can also be rapidly deployed from the storage condition when required for use. The load organizer and stabilizer is intended for folding storage in a stuff sack.

Another object of the invention is to provide a load container that subdivides or partitions a vehicle bed into separate compartments to stabilize loads resting on the floor of the bed and to prevent shifting of goods during travel. The invention is applicable, for example, for transporting groceries, shopping goods, camping gear, tools, etc.

A further object of the invention is to provide a vehicle bed load container system in which multiple load containers and stabilizers can be secured at selected locations along the vehicle bed. The fastening arrangement is intended to permit flexible deployment of single or multiple load containers.

DISCLOSURE OF THE INVENTION

In order to accomplish these results the invention provides a load container and stabilizer for a vehicle bed such as a pickup truck, van, or utility vehicle bed having a floor, and sidewalls along opposite sides of the bed, for carrying a load. An elongate container is constructed with a length dimension in the elongate direction extending between the sidewalls on opposite sides of the vehicle bed. The elongate container is constructed with elongate front, back, and bottom panels of flexible material defining a load carrying container smaller in volume than the vehicle bed for subdividing the vehicle bed.

The elongate container is also constructed with a plurality of flexible material partition panels extending between the front and back panels in turn subdividing the container into load carrying compartments for stabilizing the load and preventing shifting of the load during travel.

According to the invention first and second flaps are formed at the top of respective sides of the elongate container so that the flaps extend over surfaces of the sidewalls on opposite sides of the vehicle bed. Complementary first and second fasteners secure the elongate container to the opposite sides of the vehicle bed. The complementary first fasteners are formed on the respective first and second flaps. The complementary second fasteners are formed at selected locations along the sidewalls. The second fasteners are aligned on opposite sides of the vehicle bed. The complementary first and second fasteners therefore secure the elongate container at the specified locations of the vehicle bed.

As used in the specification and claims, the phrase "sidewall" of a vehicle bed is intended to include top rails, shelves, inside and outside surfaces, and generally any portion of the sidewall of a vehicle bed. Preferably, a horizontal surface is used, for example the surface of a top rail or shelf. However the phrase "sidewall" is defined to encompass any portion of the sidewall of a vehicle bed, inside or outside.

According to the invention the elongate front and back panels and partition panels are formed with sufficient depth between the flaps and the bottom panel so that the bottom panel rests on the floor of the vehicle bed when the flaps are secured to the sidewalls on opposite sides of the vehicle bed. The weight of a load in the elongate container is therefore supported by the floor of the vehicle bed. The container and partition panels prevent shifting of the load on the floor of the vehicle bed during travel.

A cover panel of flexible material and cover panel closure secures the cover panel over the load carrying compartments for weather protection. Importantly the elongate container is collapsible and foldable to a relatively small package for storage. The invention also provides a stuff sack sized to receive the elongate container in the collapsed and folded configuration.

According to a preferred example the width of the elongate container between the front and back panels is substantially less than the length of the vehicle bed. A plurality of complementary second fasteners can be distributed at a plurality of locations along the sidewalls. The pairs of complementary second fasteners are aligned on opposite sides of the vehicle bed along the sidewalls for securing the elongate container at different locations along the length of the vehicle bed.

In the preferred example the complementary first and second fasteners are complementary hook and loop fastening strips. One of the complementary hook and loop fastening strips are formed on the under surfaces of the flaps while the other of the complementary hook and loop fastening strips are formed on the sidewalls. A plurality of pairs of fastening strips may be secured along the sidewalls and aligned on opposite sides of the vehicle bed for securing the load container at different locations along the length of the vehicle bed. Alternatively the fastening strips secured to the sidewalls may be continuous strips formed along the entire length of the sidewalls. In the preferred example the sidewalls of the vehicle bed are formed with respective shelves along opposite sides of the vehicle bed. The complementary second fasteners in the configuration of the complementary fastening strips are formed on the upper surfaces of the shelves. Pairs of fastening strips are aligned along the shelves or continuous strips are fastened along the lengths of the shelves.

In the preferred example the panels forming the elongate container are formed of a flexible fabric material. A weatherproofing coating may be applied to the flexible fabric material. A feature of the flexible fabric material construction is that the load container and stabilizer can be collapsed and folded or rolled up for storage in a stuff sack.

In the preferred example the vehicle bed is a pickup truck bed and the shelves are the top rails along the tops of the sidewalls on opposite sides of the pickup truck bed. One of the complementary hook and loop fastening strips is formed on the top rails as aligned pairs or continuous strips for positioning the elongate container at any desired location along the pickup truck bed with the flaps secured to the top rails. The invention also provides a system of a plurality of load containers and stabilizers secured to opposite sidewalls at different locations along the length of the vehicle bed.

According to an alternative embodiment, the invention provides a smaller load container and stabilizer for securing to one sidewall of the vehicle bed with the load resting on the floor of the vehicle bed. The alternative container of generally rectangular configuration is constructed with front, back, side, and bottom panels of flexible material defining a load carrying container smaller in volume than the vehicle bed, again subdividing the vehicle bed. The alternative container is also constructed with at least one flexible material partition panel extending between the front and back panels in turn subdividing the container into load carrying compartments or pockets for stabilizing the load and for preventing shifting of the load.

A single flap is formed at the top of one side of the container so that the flap extends over the surface of one of the sidewalls of the vehicle bed. Complementary first and second fasteners secure the container to the sidewall. The first fastener is formed on the flap while the second fastener is formed at selected locations along a sidewall. The complementary first and second fasteners therefore secure the smaller container at a specified location along one of the sidewalls of the vehicle bed.

According to the alternative embodiment, the front, back, side and partition panels are also formed with sufficient depth between the flap and bottom panel so that the bottom panel rests on the floor of the vehicle bed when the flap is secured to the sidewall of the vehicle bed. The weight of a load in the container is therefore supported by the floor of the vehicle bed while the container panels prevent shifting of the load on the floor of the vehicle bed during travel.

A cover panel of flexible material with a cover panel closure also protects the load carrying compartments. The alternative container is also preferably constructed of flexible fabric material and is collapsible and foldable to a relatively small package for storage in a stuff sack.

Other objects, features and advantages of the invention are apparent in the following specification and accompanying drawings.

DESCRIPTION OF PREFERRED EXAMPLE EMBODIMENTS AND BEST MODE OF THE INVENTION

Figure 1:
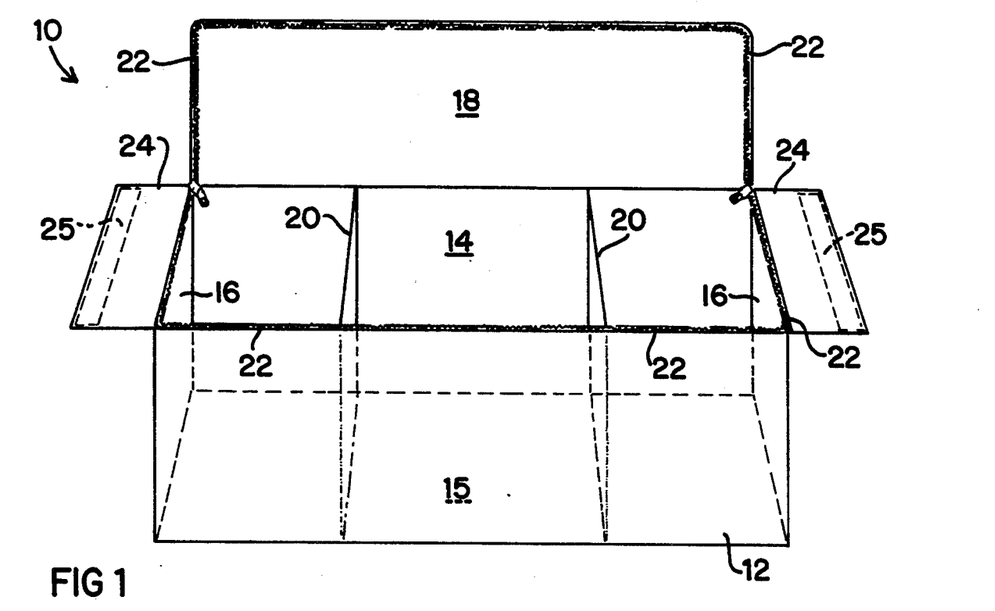
FIG. 1 is a perspective view from above of the load container and stabilizer constructed from flexible fabric material with the cover in open position.
Figure 2:
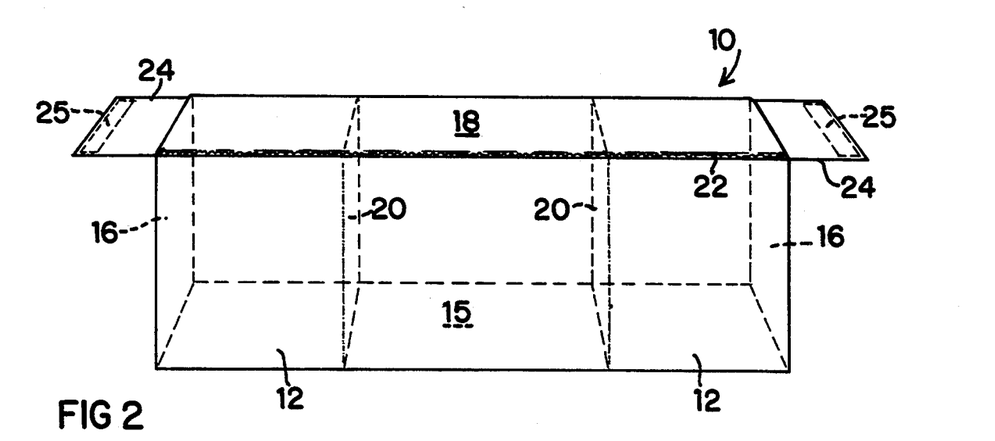
FIG. 2 is a perspective view from above of the load container and stabilizer with the cover in closed condition.
Figure 3:
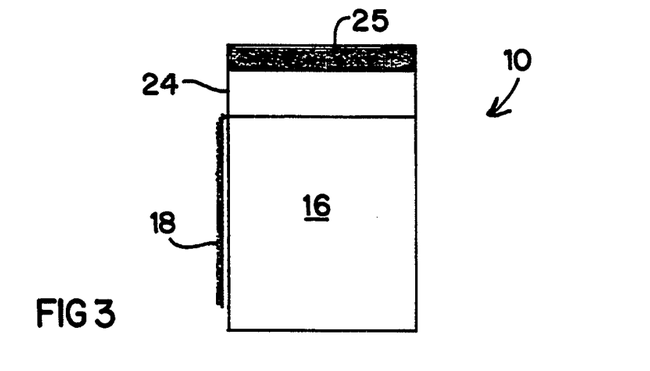
FIG. 3 is a side elevation view at one side of the load container and stabilizer with the flap extending upward to show one of the complementary hook and loop fastening strips on the under surface of the flap.

A load container and stabilizer according to the invention is illustrated in FIGS. 1–8. Referring in particular to FIGS. 1–3, the elongate container 10 is constructed from panels of a flexible fabric material with a front panel 12, rear panel 14, bottom panel 15 and side panels 16 in an elongate rectangular configuration. The front panel 12, bottom panel 15, and rear panel 14 may of course be constructed from a single continuous piece of fabric material extending beyond to the cover 18 which is therefore hinged to the rear panel 14 along the elongate axis for opening and closing over the top of the elongate container 10.

The inside of the elongate container is further partitioned into load compartments by partition panels 20 formed of the same flexible fabric material. A load to be stabilized in a vehicle bed is organized in the respective compartments separated by the partition panels 20. The perimeter of the cover 18 and top of the elongate container 10 are formed with a suitable closure such as a zipper closure 22 for protecting the load carrying compartments from weather etc.

At the top of the two sides 16 of elongate container 10 are formed two flaps 24 for deploying and securing the elongate container at a desired location in the vehicle bed as hereafter described. To this end the first and second flaps 24 are formed with fasteners complementary to fasteners formed along the sidewalls of a vehicle bed. In the example of FIGS. 1-8 the fasteners are complementary hook and loop fastening strips. As shown in FIG. 3 and in dashed outline in FIGS. 1 and 2, the under surface of each flap 24 is formed with an elongate fastening strip 25 for example a complementary hook fastening strip 25. It is noted that in FIGS. 1-3 the complementary fastening strip is secured to the flap by sewing or bonding and is aligned along the outer edge of the flap.

Figure 4:
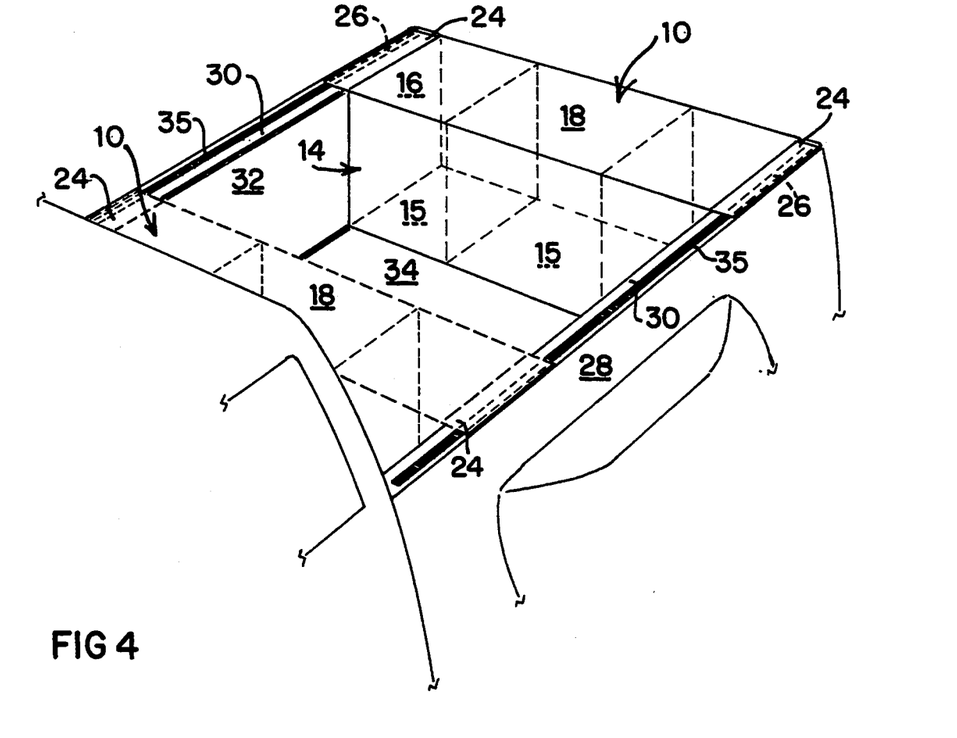
FIG. 4 is a perspective view of a pickup truck bed showing the load container and stabilizer deployed for use at a location at the rear of the pickup truck bed.
Figure 5:
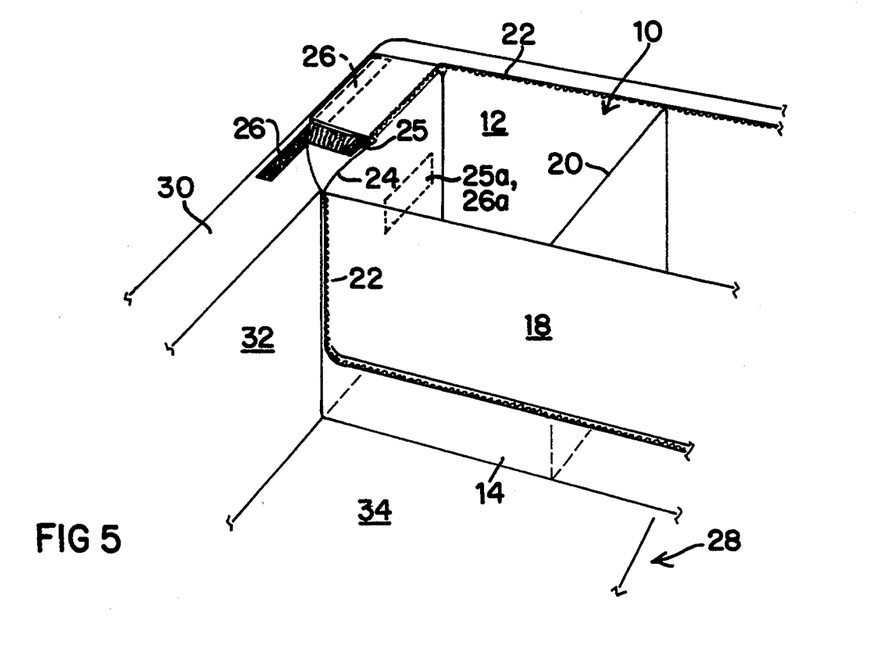
FIG. 5 is a detailed fragmentary perspective view from above showing one side of the load container and stabilizer with the cover in open position and with one end of the flap lifted up to show the complementary hook and loop fastening strips.

Referring to FIGS. 4 and 5, the elongate container 10 is shown installed for use at the rear end of a pickup truck bed 28. In this example the top rails 30 along the tops of the sidewalls 32 of the pickup truck bed form effective shelves to which the flaps 24 are secured. To this end, complementary hook and loop fastening strips 26 are bonded to the upper surface of the shelves formed by top rails 30. If complementary hook fastening strips 25 are used on the under surface of the flaps 24 then complementary loop fastening strips 26 are bonded to the top rail shelves 30 as shown in FIG. 5 where the flap 24 is partially pulled back to reveal the complementary hook and loop fastening strips 25 and 26.

The flaps may also be secured to the inside of the sidewalls if the elongate container 10 is recessed within the pickup truck vehicle bed. In that case the complementary loop fastening strips 26a are secured along the inside of the sidewall and the complementary hook fastening strips 25a are secured along the side panels of the container. The flaps may also be constructed to extend over the top rails to the outside of the sidewalls of the vehicle bed. In that case the complementary loop fastening strips are secured along the outside of the sidewall of the vehicle bed.

Importantly, the elongate container 10 is constructed as follows. The front panel 12, rear panel 14, side panels 16 and partition panels 20 are formed with sufficient depth from the flaps 24 to the bottom panel 15 so that the bottom panel 15 rests on the floor 34 of the pickup truck bed or other vehicle bed. By this arrangement goods placed in the compartments of the elongate container 10 rest directly on the pickup truck bed floor 34. Thus the weight of a load is borne by the vehicle bed floor 34 and not the flexible, fabric material panels of the elongate container 10. The flexible fabric panels 12,14,16, and 20 perform instead the important function of stabilizing the load and preventing shifting of the load on the floor of the vehicle bed during travel.

As further shown in FIG. 4, multiple elongate containers 10 can be deployed at the same time in the vehicle bed at selected locations. In the example of FIG. 4 a second elongate container 10 is shown installed at the front of the pickup truck bed as well as the rear of the pickup truck bed. To accomplish this, complementary hook and loop fastening strips are also bonded on the top rail shelves 30 at the front of the pickup truck bed. A plurality of pairs of fastening strips can be bonded along the upper surface of the top rail shelves for installing a single elongate container 10 at different locations or for securing a plurality of containers. Each pair of complementary fastening strips such as the complementary loop fastening strips are positioned in alignment across the vehicle bed.

Alternatively a single continuous fastening strip such as an elongate complementary loop fastening strip 35 can be bonded along the full length of the top rails from front to back so that elongate containers 10 can be installed at any locations along the length of the pickup truck bed.

Figure 6:
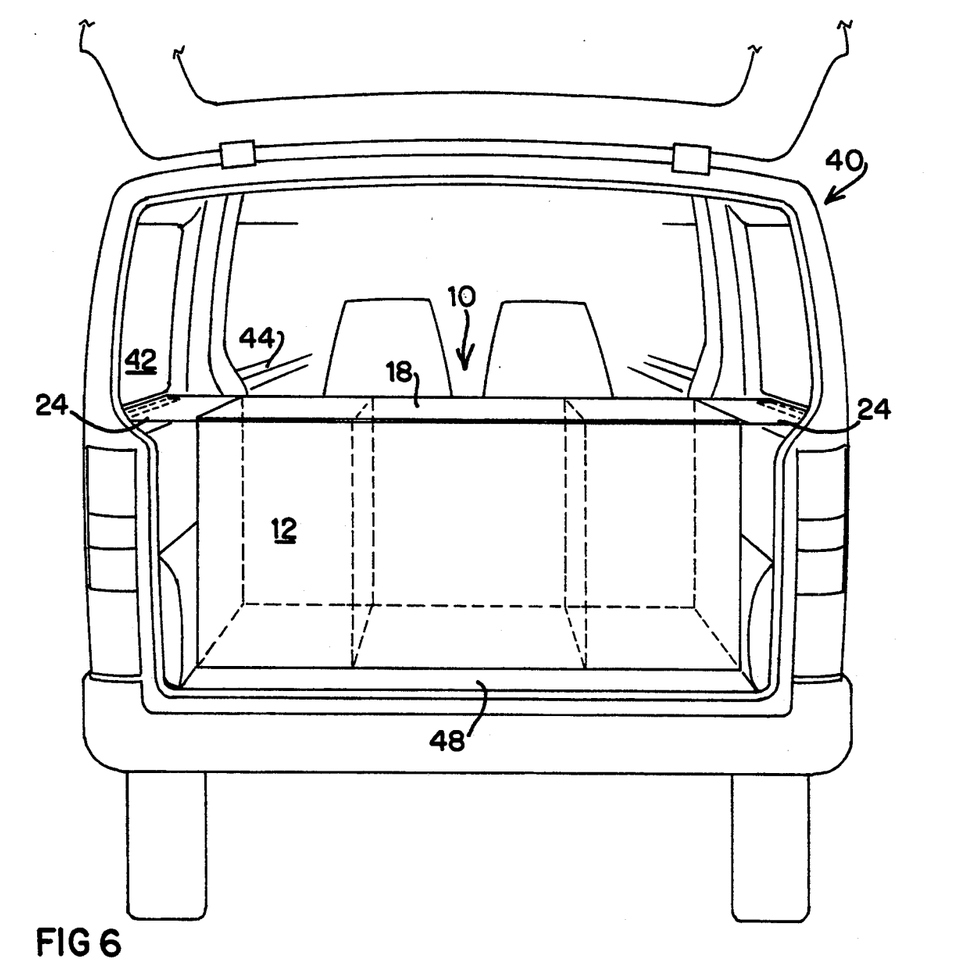
FIG. 6 is a rear end side elevation view of the back of a van with the rear door in open position showing the load container and stabilizer deployed for use in the cargo bed at the rear of the van.

As shown in FIG. 6 the load container and stabilizer 10 has a variety of applications generally in any vehicle bed such as the load carrying bed of a van 40 or other utility vehicle. The sidewalls 42 of the trunk or load carrying vehicle bed are formed with shelves 44 along opposite sides of the vehicle bed. The elongate carrier 10 extends between the opposite sidewalls 42 with the flaps 24 secured to the shelves 44 by complementary hook and loop fastening strips formed respectively on the under surfaces of flaps 24 and the upper surfaces of shelves 44. The depth dimension of the flexible fabric panels 12,14,16, and 20 is sufficient so that the bottom panel rests on the floor 48 of the van cargo bed. The load container and stabilizer 10 may similarly be deployed in the cargo beds of station wagons, squarebacks, and utility vehicles generally.

Figures 7, 8:
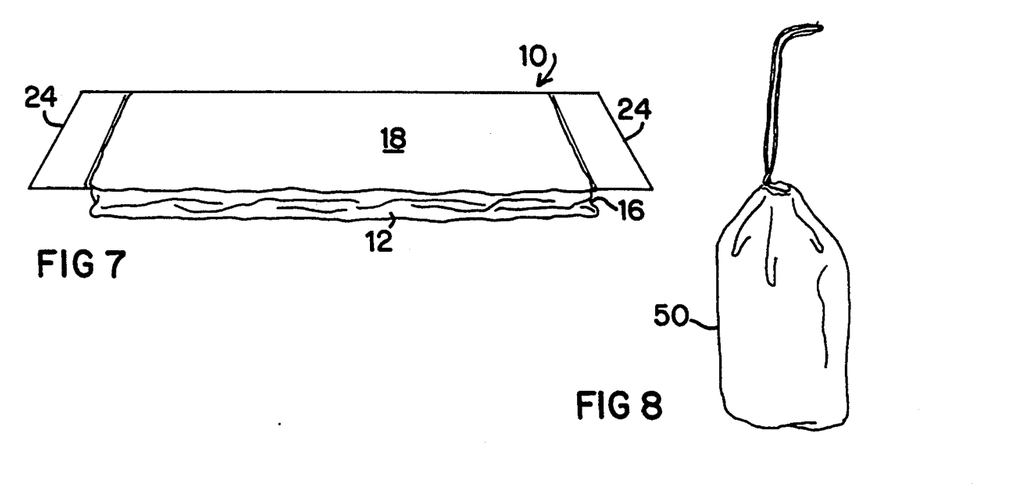
FIG. 7 is a plan view from above showing the elongate container in collapsed condition before it is folded up or rolled up.
FIG. 8 is a side elevation view of the stuff sack containing the collapsed and folded load container and stabilizer.

The elongate container 10 is shown in collapsed condition in FIG. 7. The vertical panels 12,14,16 and 20-60, collapse by, for example, accordion folding so that the cover 18 effectively lies on top of the bottom panel 15. The collapsed elongate container 10 can then be folded or rolled up and stored in a stuff sack 50 as shown in FIG. 8. The stuff sack can be conveniently stored in a small space on the vehicle for rapid installation when needed.

Figure 9:
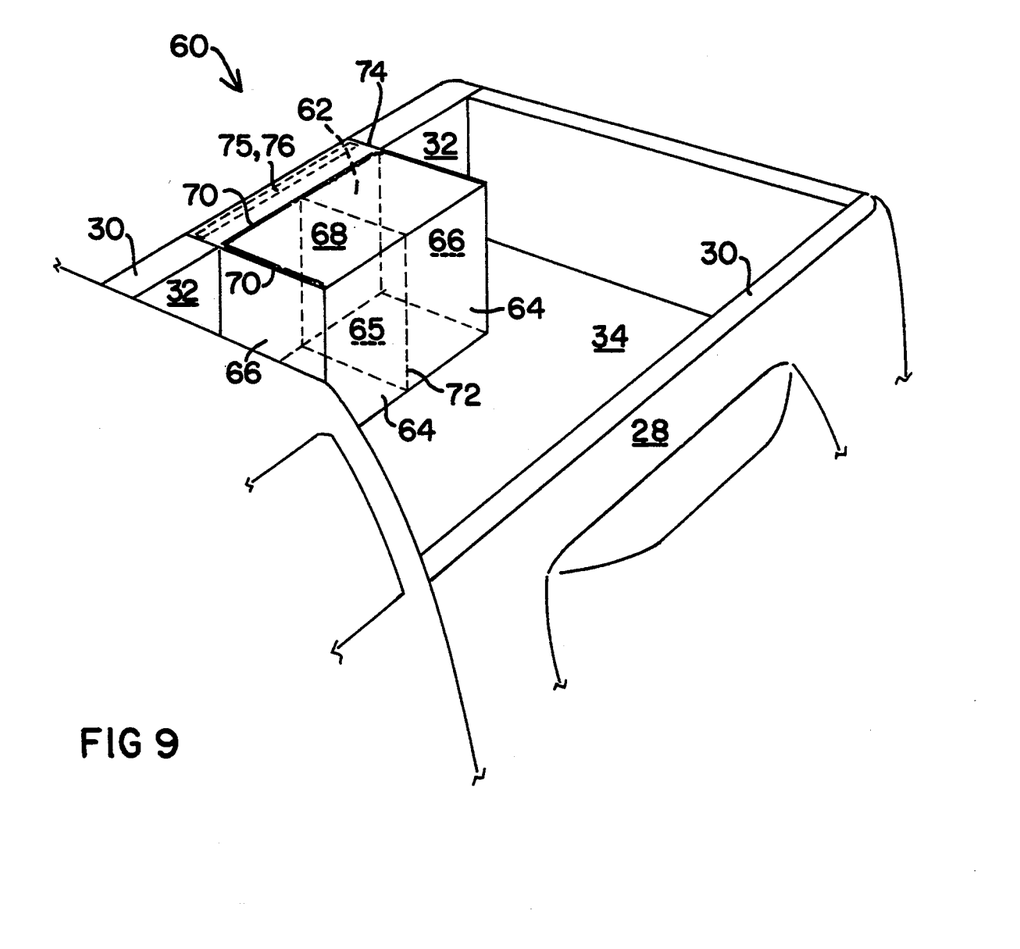
FIG. 9 is a perspective view of a pickup truck bed showing an alternative embodiment of a smaller load container and stabilizer secured to one sidewall of the pickup truck bed.

An alternative load container and stabilizer 60 is illustrated in FIG. 9 for use with smaller loads. The smaller container 60 is constructed with a front panel 62, back panel 64, bottom panel 65, and side panels 66 dimensioned to provide a generally rectangular container 60 for example less than half the volume than the elongate container 10. The smaller container 60 is similarly constructed from a flexible fabric material and includes a cover panel 68 hinged to the back panel 64 with a zipper closure 70 for weather protection. As heretofore described, the front panel 62, bottom panel 65, back panel 64, and cover panel 68 can be formed from a single piece of the flexible fabric material or from separate panels sewn together.

The small container 60 is formed with only a single flap 74 along the front side of the container. The flap is secured to a side wall of the pickup truck bed or other vehicle bed by complementary fasteners secured to the flap 74 and sidewall 32. In the preferred example the complementary fasteners are complementary hook and loop fastening strips 75,76 formed respectively on the undersurface of flap 74 and the upper surface of the top rail 30 of the sidewall 32. As noted above the top rail 30 forms an effective shelf of the sidewall 32 for securing the flap 74 to the sidewall.

The depth dimension of the front panel 62, back panel 64, side panels 66 and partition panel 74 are also selected so that the bottom panel 65 rests on the floor 34 of the pickup truck vehicle bed. By this arrangement the weight of the load in the small container 60 rests on and is supported by the floor 34 of the pickup truck bed rather than by the flexible fabric panels. The flexible fabric panels perform the function of restraining and stabilizing the load and preventing the shifting of the load during travel.

A suitable flexible fabric material for use in constructing the load containers and stabilizers according to the invention is Cordura Nylon (TM) or other tight weave natural or synthetic fibers. Thus, in the preferred example, the material for constructing the load containers and stabilizers is a pliable, foldable, and flexible material. The fabric can be impregnated with water resistant or water proofing compound for weather protection. Composite flexible materials may also be used, for example with composite fabric and plastic or resin layers.

While the invention has been described with reference to particular example embodiments it is intended to cover all modifications and equivalents within the scope of the following claims.

I claim:

1. A load container and stabilizer for a vehicle bed such as a pickup truck, van, or utility vehicle bed having a floor, and sidewalls along the opposite sides of the bed, for carrying a load, said vehicle bed comprising:

an elongate container constructed with a length dimension in the elongate direction extending between the sidewalls on opposite sides of the vehicle bed;

said elongate container comprising elongate front, back, and bottom panels of pliable, foldable, flexible material defining a load carrying container smaller in volume than the vehicle bed for subdividing the vehicle bed;

first and second flaps of pliable, foldable, flexible material formed at the top of respective sides of the elongate container so that the flaps extend over surfaces of the sidewalls on opposite sides of the vehicle bed;

complementary first and second fastening means, said first fastening means being formed on the respective first and second flaps, and said second fastening means being formed at selected locations along the sidewalls, said second fastening means being aligned on opposite sides of the vehicle bed, said complementary first and second fastening means securing the elongate container at a specified location of the vehicle bed with the flaps fastened to the sidewalls by the first and second fastening means;

said elongate front and back panels being formed with sufficient depth between the flaps and bottom panel so that the bottom panel rests on the floor of the vehicle bed when the flaps are secured to the sidewalls on opposite sides of the vehicle bed and the weight of a load in the elongate container is supported by the floor of the vehicle bed, said container preventing shifting of said load on the floor of the vehicle bed during travel;

said elongate container being collapsible and foldable to a relatively small package for storage.

2. The load container and stabilizer of claim 1 wherein the width of the elongate container between the front and back panels is substantially less than the length of the vehicle bed.

3. The load container and stabilizer of claim 2 comprising a plurality of pairs of complementary second fastening means distributed at a plurality of locations along the sidewalls, said pairs of complementary second fastening means being aligned on opposite sides of the vehicle bed along the sidewalls for securing the elongate container at different locations along the length of the vehicle bed.

4. The load container and stabilizer of claim 3 wherein the vehicle bed is a pickup truck bed and the shelves are the top rails, and wherein the second fastening means are formed along the length of said top rails for positioning the elongate container at selected locations along the length of the pickup truck bed with the flaps secured to the top rails.

5. A plurality of load containers and stabilizers as set forth in claim 3, said elongate containers being secured to opposite sidewalls at different locations along the length of the vehicle bed.

6. The load container and stabilizer of claim 3 wherein the complementary first and second fastening means comprise complementary hook and loop fastening strips, and comprising a plurality of pairs of said fastening strips secured along the sidewalls and aligned on opposite sides of the vehicle bed for securing the load container at different locations along the length of the vehicle bed.

7. The load container and stabilizer of claim 1 wherein the sidewalls of the vehicle bed comprise respective shelves along opposite sides of the vehicle bed and wherein the complementary second fastening means are formed at selected locations along the shelves aligned on opposite sides of the vehicle bed.

8. The load container and stabilizer of claim 7 wherein the complementary first and second fastening means comprise complementary hook and loop fastening strips, one of said complementary hook and loop fastening strips being formed on the under surfaces of the flaps and the other of said complementary hook and loop fastening strips being formed on the upper surfaces of the shelves.

9. The load container and stabilizer of claim 8 wherein the vehicle bed is a pickup truck bed and the shelves are the top rails along the tops of the sidewalls on opposite sides of the pickup truck bed, and wherein the other of said hook and loop fastening strips is formed on said top rails for positioning the elongate container at a desired location of the pickup truck bed with the flaps secured to the top rails and further comprising a cover panel of pliable, foldable, flexible material and cover panel closure means for closing the cover panel over the load carrying compartment.

10. The load container and stabilizer of claim 8 wherein the other of said complementary hook and loop fastening strips are formed as continuous strips along the lengths of the upper surfaces of the shelves on opposite sides of the vehicle bed for securing the elongate container at different locations along the length of the vehicle bed.

11. The load container and stabilizer of claim 7 wherein the vehicle bed is a pickup truck bed and the shelves are the top rails along the tops of the sidewalls on opposite sides of the pickup truck bed.

12. The load container and stabilizer of claim 1 wherein the flexible material comprising the panels of the elongate container is a flexible fabric material.

13. The load container and stabilizer of claim 12 comprising a stuff sack sized to receive the elongate container in the collapsed and folded configuration.

14. The load container and stabilizer of claim 1 wherein said elongate container comprises a plurality of pliable, foldable, flexible material partition panels extending between the front and back panels in turn subdividing the container into load carrying compartments for further stabilizing a load and preventing shifting of the load in the vehicle bed.

15. A load container and stabilizer for a vehicle bed such as a pickup truck, van, or utility vehicle bed having a floor and sidewalls for carrying a load, said vehicle bed sidewalls comprising shelves formed along opposite sides of the bed, comprising:

an elongate container constructed with a length dimension in the elongate direction extending between the sidewalls on opposite sides of the vehicle bed;

said elongate container comprising elongate front, back, and bottom panels of flexible fabric material defining a load carrying container smaller in volume than the vehicle bed for subdividing the vehicle bed;

said elongate container comprising a plurality of flexible fabric material partition panels extending between the front and back panels in turn subdividing the container into load carrying compartments for stabilizing a load and preventing shifting of the load in the vehicle bed;

first and second flaps formed at the top of respective sides of the elongate container so that the flaps extend over the respective shelves on opposite sides of the vehicle bed;

complementary first and second fastening means, said first fastening means being formed on the respective first and second flaps, and said second fastening means being formed at selected locations along the shelves, said second fastening means being aligned on opposite sides of the vehicle bed, said complementary first and second fastening means securing the elongate container at a specified location of the vehicle bed;

said elongate front and back panels and partition panels being formed with sufficient depth between the flaps and bottom panel so that the bottom panel rests on the floor of the vehicle bed when the flaps are secured to the shelves on opposite sides of the vehicle bed and the weight of a load in the elongate container is supported by the floor of the vehicle bed, said container and partition panels preventing shifting of said load on the floor of the vehicle bed during travel;

a cover panel of flexible fabric material and cover panel closure means for closing the cover panel over the load carrying compartment;

said elongate container being collapsible and foldable to a relatively small package for storage;

said complementary first and second fastening means comprising complementary hook and loop fastening strips, one of said complementary hook and loop fastening strips being formed on the under surfaces of the flaps and the other of said complementary hook and loop fastening strips being formed on the upper surfaces of the shelves.

16. The load container and stabilizer of claim 15 comprising a stuff sack sized to receive the elongate container in the collapsed and folded configuration.

17. The load container and stabilizer of claim 15 wherein the vehicle bed is a pickup truck bed and the shelves are the top rails on the tops of the sidewalls on opposite sides of the pickup truck bed, and wherein the other of said hook and loop fastening strips is formed on said top rails for positioning the elongate container at a desired location of the pickup truck bed with the flaps secured on the top rails.

18. A plurality of load containers and stabilizers as set forth in claim 17, said elongate containers being secured to opposite sidewalls at different locations along the length of the pickup truck bed.

19. The plurality of load containers and stabilizers as set forth in claim 18 comprising a plurality of stuff sacks sized to receive the respective load containers and stabilizers in collapsed and folded configuration.

20. A load container and stabilizer for a vehicle bed such as a pickup truck, van, or utility vehicle bed having a floor and sidewalls for carrying a load, comprising:

a container comprising front, back, side, and bottom panels of flexible fabric material defining a load carrying container smaller in volume than the vehicle bed for subdividing the vehicle bed;

a flexible fabric material flap formed at the top of one side of the container so that the flap extends over the surface of one of the sidewalls of the vehicle bed;

complementary first and second fastening means, said first fastening means being formed on the flap, and said second fastening means being formed at selected locations along a sidewall, said complementary first and second fastening means securing the container at a specified location along a sidewall of the vehicle bed with the flap fastened to the sidewall by said first and second fastening means;

said front, back, and side panels being formed with sufficient depth between the flap and bottom panel so that the bottom panel rests on the floor of the vehicle bed when the flap is secured to the sidewall of the vehicle bed and the weight of a load in the container is supported by the floor of the vehicle bed, said container panels preventing shifting of said load on the floor of the vehicle bed during travel;

said container being collapsible and foldable to a relatively small package for storage.

21. The load container and stabilizer of claim 20 comprising at least one flexible fabric material partition panel extending between front and back panels in turn subdividing the container into load carrying compartments for further stabilizing a load and preventing shifting of the load in the vehicle bed.

22. The load container and stabilizer of claim 21 further comprising a cover panel of flexible fabric material and cover panel closure means for closing the cover panel over the load carrying compartment for weather protection.

23. A load container and stabilizer for a vehicle bed such as a pickup truck, van, or utility vehicle bed having a floor and sidewalls for carrying a load, comprising:

an elongate container comprising side panels and elongate front, back, and bottom panels of pliable, foldable flexible material defining a load carrying container smaller in volume than the vehicle bed for subdividing the vehicle bed;

said elongate container being constructed with a length dimension in the elongate direction extending between the sidewalls on opposite sides of the vehicle beds so that the side panels of the elongate container contact the sidewalls of the vehicle bed;

first fastening means formed on the respective side panels of the elongate container;

second fastening means complementary with the first fastening means formed on the sidewalls of the vehicle bed, said complementary first and second fastening means being arranged in alignment so that the side panels of the elongate container can be secured to the sidewalls of the vehicle bed for supporting the elongate container at a desired location in the vehicle bed;

said side panels and elongate front and back panels being formed with sufficient depth so that the bottom panel of the elongate container rests on the floor of the vehicle bed when the side panels of the elongate container are secured to the sidewalls of the vehicle bed and so that the weight of a load in the elongate container is supported by the floor of the vehicle bed, said elongate container reducing shifting of said load on the floor of the vehicle bed during travel;

said elongate container being collapsible and foldable to a relatively small package for storage.

24. The load container and stabilizer of claim 23 comprising a plurality of pliable, foldable, flexible material partition panels extending between the front and back panels in turn subdividing the container into load carrying compartments for further stabilizing a load and reducing shifting of the load in the vehicle bed.

25. The load container and stabilizer of claim 24 comprising a cover panel of pliable, foldable, flexible material and cover panel closure means for closing the cover panel over the load, carrying compartment.

26. A load container and stabilizer for a vehicle bed such as a pickup truck, van, or utility vehicle bed having a floor, and sidewalls along the opposite sides of the bed, for carrying a load, said vehicle bed comprising:

an elongate container constructed with a length dimension in the elongate direction extending between the sidewalls on opposite sides of the vehicle bed;

said elongate container comprising elongate front, back, and bottom panels of pliable, foldable, flexible material defining a load carrying container smaller in volume than the vehicle bed for subdividing the vehicle bed;

first and second flaps of pliable, foldable, flexible material formed at the top of respective sides of the elongate container so that the flaps extend over surfaces of the sidewalls on opposite sides of the vehicle bed;

complementary first and second fastening means, said first fastening means being formed on the respective first and second flaps, and said second fastening means being formed at selected locations along the sidewalls, said second fastening means being aligned on opposite sides of the vehicle bed, said complementary first and second fastening means securing the elongate container at a specified location of the vehicle bed with the flaps fastened to the sidewalls by the first and second fastening means;

said elongate front and back panels being formed with sufficient depth between the flaps and bottom panel so that the bottom panel rests on the floor of the vehicle bed when the flaps are secured to the sidewalls on opposite sides of the vehicle bed and the weight of a load in the elongate container is supported by the floor of the vehicle bed, said container and partition panels preventing shifting of said load on the floor of the vehicle bed during travel;

said elongate container being collapsible and foldable to a relatively small package for storage;

said elongate container being constructed so that the width of the elongate container between the front and back panels is substantially less than the length of the vehicle bed, and a plurality of pairs of complementary second fastening means distributed at a plurality of locations along the sidewalls, said pairs of complementary second fastening means being aligned on opposite sides of the vehicle bed along the sidewalls for securing the elongate container at different locations along the length of the vehicle bed.

27. The load container and stabilizer of claim 26 wherein the complementary first and second fastening means comprise complementary hook and loop fastening strips, and comprising a plurality of pairs of said fastening strips secured along the sidewalls and aligned on opposite sides of the vehicle bed for securing the load container at different locations along the length of the vehicle bed.

28. The load container and stabilizer of claim 27 wherein the vehicle bed is a pickup truck bed and the shelves are the top rails along the tops of the sidewalls on opposite sides of the pickup truck bed.

29. The load container and stabilizer of claim 28 wherein said elongate container comprises a plurality of pliable, foldable flexible material partition panels extending between the front and back panels in turn subdividing the container into load carrying compartments for further stabilizing a load and preventing shifting of the load in the vehicle bed.

30. A load container and stabilizer for a vehicle bed such as a pickup truck, van, or utility vehicle bed having a floor, and sidewalls along the opposite sides of the bed, for carrying a load, said vehicle bed comprising:

an elongate container constructed with a length dimension in the elongate direction extending between the sidewalls on opposite sides of the vehicle bed;

said elongate container comprising elongate front, back, and bottom panels of flexible fabric material defining a load carrying container smaller in volume than the vehicle bed for subdividing the vehicle bed;

first and second flaps of flexible fabric material formed at the top of respective sides of the elongate container so that the flaps extend over surfaces of the sidewalls on opposite sides of the vehicle bed;

complementary first and second fastening means, said first fastening means being formed on the respective first and second flaps, and said second fastening means being formed at selected locations along the sidewalls, said second fastening means being aligned on opposite sides of the vehicle bed, said complementary first and second fastening means securing the elongate container at a specified location of the vehicle bed with the flaps fastened to the sidewalls by said first and second fastening means;

said elongate front and back panels being formed with sufficient depth between the flaps and bottom panel so that the bottom panel rests on the floor of the vehicle bed when the flaps are secured to the sidewalls on opposite sides of-the vehicle bed and the weight of a load in the elongate container is supported by the floor of the vehicle bed, said container and partition panels preventing shifting of said load on the floor of the vehicle bed during travel;

said elongate container being collapsible and foldable to a relatively small package for storage.

31. The load container and stabilizer of claim 30 comprising at least one flexible fabric material partition panel extending between front and back panels in turn subdividing the container into load carrying compartments or pockets for further stabilizing a load and preventing shifting of the load in the vehicle bed.

* * * * *